United States Patent
McAuliffe et al.

(10) Patent No.: US 8,763,458 B2
(45) Date of Patent: Jul. 1, 2014

(54) SPEED SENSOR MODULE

(75) Inventors: Christopher McAuliffe, Windsor, CT (US); Michael Zager, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 275 days.

(21) Appl. No.: 13/347,957

(22) Filed: Jan. 11, 2012

(65) Prior Publication Data

US 2013/0174659 A1      Jul. 11, 2013

(51) Int. Cl.
*G01P 1/02*     (2006.01)
*G01P 3/00*     (2006.01)

(52) U.S. Cl.
USPC .................................. 73/493; 73/494; 73/431

(58) Field of Classification Search
USPC .......... 73/493, 494, 431, 866.5, 117.1, 117.3; 415/118; 416/189, 191
See application file for complete search history.

(56) References Cited

U.S. PATENT DOCUMENTS

| | | | |
|---|---|---|---|
| 4,548,548 A * | 10/1985 | Gray, III ........................ | 416/189 |
| 6,283,410 B1 | 9/2001 | Thompson | |
| 6,870,686 B2 * | 3/2005 | Wilson et al. .................. | 359/642 |
| 6,997,686 B2 * | 2/2006 | Agrawal et al. ............... | 417/350 |
| 2009/0068446 A1 * | 3/2009 | Bischof et al. ................ | 428/336 |
| 2010/0104436 A1 * | 4/2010 | Herr et al. ........................ | 416/31 |
| 2013/0177399 A1 * | 7/2013 | McAuliffe et al. ........... | 415/118 |

\* cited by examiner

*Primary Examiner* — Helen Kwok
(74) *Attorney, Agent, or Firm* — Cantor Colburn LLP

(57) ABSTRACT

An insert cover for a speed sensor module includes an elongated body having a length aligned along a longitudinal axis, the elongated body including a convex top surface and a uniform width along the length; a first portion emanating from the top surface at a first end of the elongated body; a second portion emanating from the top surface at a diametrically opposed second end of the elongated body; and a third portion emanating from the top surface between the first portion and the second portion; where each of the first, second, and third portions are orthogonal to the longitudinal axis.

18 Claims, 3 Drawing Sheets

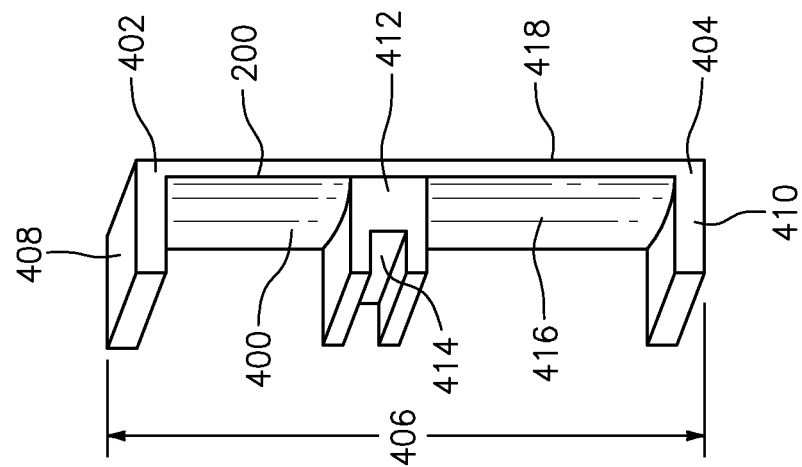
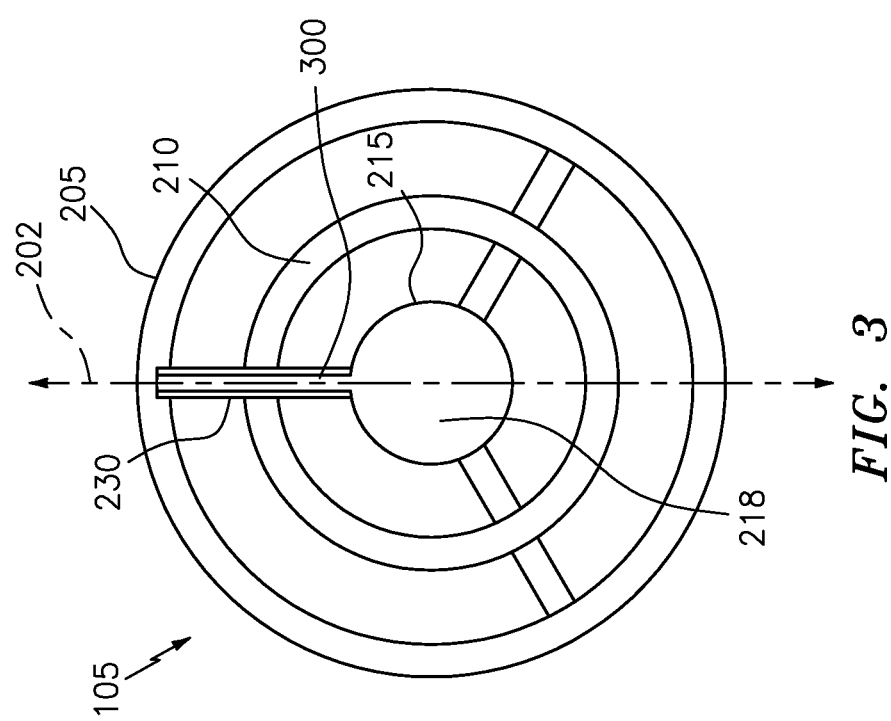
FIG. 3
FIG. 4

SPEED SENSOR MODULE

FIELD OF INVENTION

This invention generally relates to an air cycle machine for environmental control systems (ECSs) and, more particularly, to a cover portion that may be selectively coupled to a speed sensor module.

DESCRIPTION OF RELATED ART

Conventional aircraft environmental control systems (ECSs) incorporate an air cycle machine, also referred to as an air cycle cooling machine, for use in cooling and dehumidifying air for supply to the aircraft cabin for occupant comfort. Such air cycle machines may comprise two or more wheels disposed at axially spaced intervals along a common shaft. The wheels are part of, for example, a compressor rotor, a turbine rotor, a fan rotor or an additional turbine rotor or an additional compressor rotor. In some cases the turbine or turbines drive both the compressor and the fan.

On aircraft powered by turbine engines, the air to be conditioned in the air cycle machine is typically compressed air bled from one or more of the compressor stages of the turbine engine. In conventional systems, this bleed air is passed through the air cycle machine compressor wherein it is further compressed. The compressed air is passed through a condensing heat exchanger to cool the compressed air sufficiently, remove moisture, and dehumidify the air. The dehumidified compressed air is expanded in the turbine of the air cycle machine to extract energy from the compressed air and cool the expanded turbine exhaust air. The extracted energy is used to drive the shaft while the cooled air is supplied to the cabin as conditioned cooling air. A speed sensor is generally used to measure the rotational speed of the shaft in order to diagnose faults or issues with performance. However, installing the speed sensor within the air cycle machine requires threading the associated speed sensor connection through the attached ducting and housings, resulting in a complex installation process.

BRIEF SUMMARY

According to one aspect of the invention, an insert cover for a speed sensor module includes an elongated body having a length aligned along a longitudinal axis, the elongated body including a convex top surface and a uniform width along the length; a first portion emanating from the top surface at a first end of the elongated body; a second portion emanating from the top surface at a diametrically opposed second end of the elongated body; and a third portion emanating from the top surface between the first portion and the second portion; where each of the first, second, and third portions are orthogonal to the longitudinal axis.

According to another aspect of the invention, a speed sensor module in an environmental control system includes an outer portion aligned having a first bore aligned on a shaft axis; an intermediate portion having a second bore aligned on the shaft axis; an inner portion aligned on the shaft axis, the inner portion including a speed sensor for sensing a rotational speed of the shaft; at least one air foil traversing each of the outer, intermediate, and inner portions; and an insert cover configured to be selectively coupled to the at least one air foil; where the outer portion is configured for surrounding each of the intermediate portion and the inner portion within the first bore.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the FIGURES:

FIG. 3 illustrates a front elevation view of the speed sensor module shown in FIGS. 1 and 2 without the insert cover portion according to an embodiment of the invention; and FIG. 4 illustrates a perspective side view of the insert cover portion shown in FIG. 2 according to an embodiment of the invention.

DETAILED DESCRIPTION

Embodiments of a speed sensor module include a selectively removable cover portion that is coupled to an air foil in an air cycle machine, with embodiments being discussed below in detail. The speed sensor module is generally cylindrical in shape and includes an elongated insert cover portion that is selectively attached over an underlying groove disposes along an axis in the speed sensor module. The underlying groove is configured for receiving a speed sensor cable that traverses length of the underlying groove.

Figure 1:
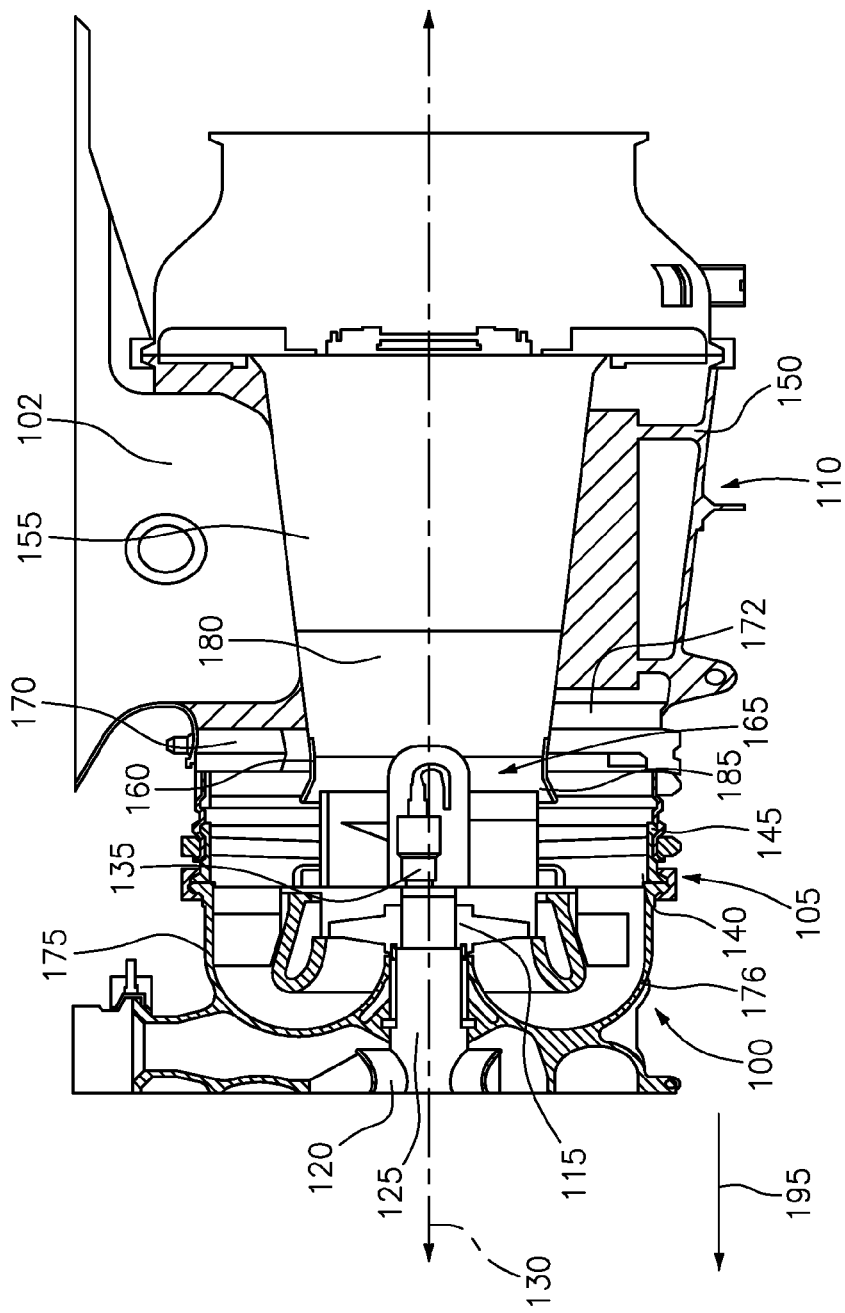
FIG. 1 illustrates a side view, partly in section, of an air cycle machine including a speed sensor module connected to a fan inlet and diffuser assembly according to an embodiment of the invention.

Referring to the drawings, FIG. 1 illustrates an example air cycle machine 100 coupled to a speed sensor module 105 and a fan inlet and diffuser assembly 110 (hereinafter "diffuser assembly 110") according to an embodiment of the invention. Particularly, the air cycle machine 100 includes a fan 115 mounted to a compressor (not shown) and a turbine 120 via a shaft 125, which extends along the central axis 130 of the air cycle machine 100. In an embodiment, the fan 115 and the compressor (not shown) are powered by turbine 120, which rotatably drives the shaft 125 in response to the expansion of the compressed air being conditioned as it passes through the air cycle machine 100. Also shown, the air cycle machine 100 is coupled to a speed sensor module 105 including a speed sensor 135 for measurement of the rotational speed of the shaft 125. The speed sensor module 105 is generally cylindrical in shape and is coupled at its proximal end 140, in one embodiment, to the air cycle machine 100 and at its distal end 145 to the diffuser assembly 110

Also, the speed sensor module 105 is coupled to the diffuser assembly 110 for circulating gaseous cooling ram air through a heat exchanger 102 in an environmental control system (not shown). Particularly, the diffuser assembly 110 includes an axially extending outer housing 150 coupled to an axially extending inner housing 155, both of which are longitudinally aligned along the central axis 130. The diffuser assembly 110 is coupled to, at the proximal end 160, to a generally cylindrical assembly 165 having a circumference that envelops the intermediate cylindrical portion 210 (shown in FIG. 2) of the speed sensor module 105, thereby creating an ejector gap 185 between the intermediate cylindrical portion 210 (shown in FIG. 2) and the cylindrical assembly 165. The cylindrical assembly 165 axially extends in direction 195 away from the diffuser assembly 110 and is coupled to the proximate end 160 of the assembly 165. In another embodiment, the diffuser assembly 110 is provided without the cylindrical assembly 165 and is directly coupled at its proximal end 160 to the distal end 145 of the diffuser assembly 110. Also, the exterior housing 150 facilitates airflow through the inlet flow passageway 170 proximate to the inlet side of the fan 115 and into the semi-toroidal shaped ducts 175, 176 while inner housing 155 facilitates air flow from the inlet flow passageways 170, 172 in and out of the outlet flow passageway 180 through the ejector gap 185.

Figure 2:
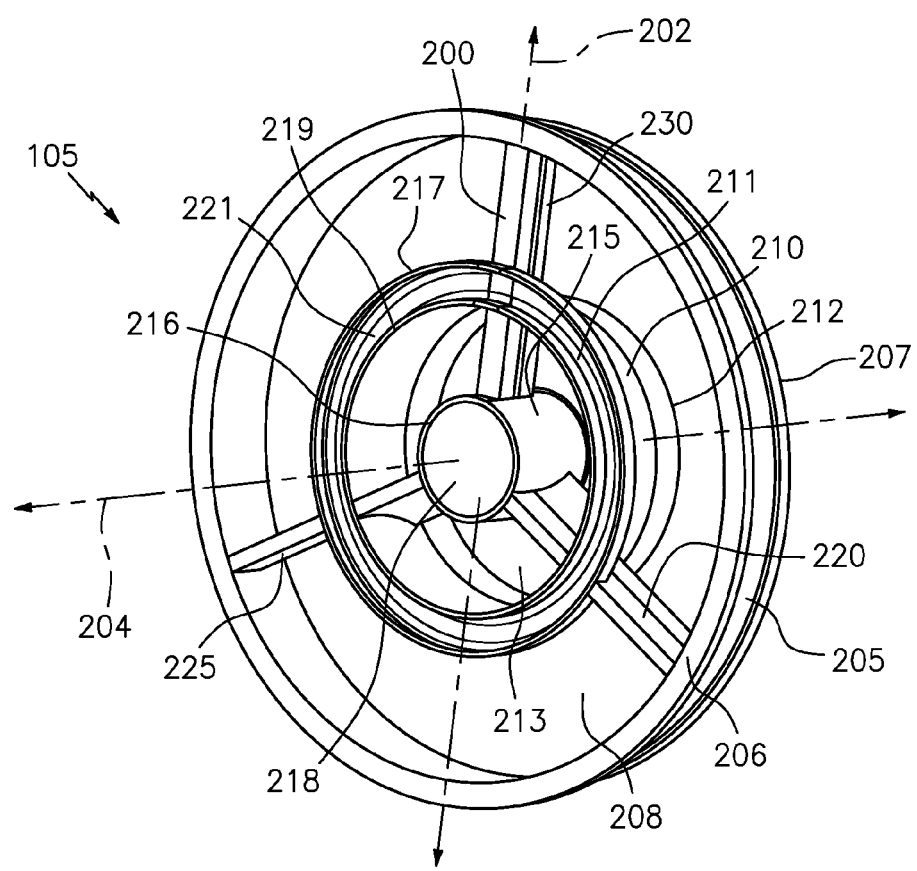
FIG. 2 illustrates a perspective view of the speed sensor module shown in FIG. 1 having the insert cover portion according to an embodiment of the invention.

FIG. 2 illustrates a detailed view of the speed sensor module 105 including insert cover portion 200 according to an embodiment of the invention. Particularly, speed sensor module 105 includes a generally elongated cover portion 200 that is selectively coupled, in one embodiment, to an air foil 230 that resides along a longitudinal axis 202 as is described below. Also, speed sensor module 105 is generally cylindrical in shape and includes an outer cylindrical portion 205, an intermediate cylindrical portion 210, and an inner cylindrical portion 215 that are all aligned along axis 204. Outer cylindrical portion 205 has a generally cylindrical-shaped body portion extending from end 206 to end 207 and includes a bore or cavity 208 aligned along axis 204. Also, outer cylindrical portion 205 includes intermediate cylindrical portion 210 and inner cylindrical portion 215 within its bore 208.

Intermediate cylindrical portion 210 also has a generally cylindrical body that extends from end 211 to end 212 and includes a bore 213 aligned along axis 204. Also, end 211 includes a plurality of raised circumferential edges 217, 219 that cooperatively enclose a channel or groove 221. The circumferential edges 217, 219 may vary in height and are provided to abut or mate with housing of fan 115 (FIG. 1). Further, bore 213 includes inner cylindrical portion 215. Inner cylindrical portion 215 is generally cylindrical in shape and extends from an open end 216 to a diametrically opposed closed end (not shown). In an embodiment, opposed closed end of portion 215 is semi-spherical in shape. The cylindrical portion 215 includes a cavity 218 that is aligned along axis 204. Portion 215 encloses a volume within cavity 218, which is provided to receive a speed sensor (not shown). Further, each of the portions 205, 210, 215 are coupled to, in one embodiment, a plurality of airfoils 220, 225, and 230, which are symmetrically coupled to each of the portion 205, 210, 215 and emanate from axis 204 outwardly and terminate at inner surface of outer cylindrical portion 205. In another embodiment, additional airfoils, for example airfoil 230, may be provided for speed sensor module 105. Each airfoil 220, 225, and 230 resides on respective longitudinal axes, with each axis being orthogonal to axis 204 of portions 205, 210, and 215.

In an embodiment, air foil 230 includes a generally elongated insert cover portion 200 that is selectively coupled to air foil 230 along its longitudinal axis 202. The insert cover portion 200 has a length that is, once coupled to air foil 230, dimensioned to emanate from end 206 and terminate at open end 216. Also, insert cover portion 200 includes features on its facia that causes airfoil 230 to look substantially similar to air foils 220 and 225 once coupled to airfoil 230. It is to be appreciated that either or both of the other air foils 220, 225 may also include an insert cover portion such as, for example, insert cover portion 200 in other embodiments. The insert cover portion is provided to facilitate ease of assembly of the speed sensor 135 (FIG. 1), which is received in an inner cavity or aperture 300 (FIG. 3) by selectively coupling the insert cover portion 200 over the speed sensor 135 and eliminate drilling of additional holes in the speed sensor module 105 to install the speed sensor 135 (FIG. 1).

As shown in FIG. 3, speed sensor module 105 includes an air foil 230 that has an inner cavity or aperture 300, which is aligned along axis 202. The aperture 300 substantially traverses the length of the airfoil 230 and emanates from inside cavity 218 and traverses each of the portions 205, 210, 215 to provide a channel or groove for receiving one or more connecting wires (not shown) such as, for example, an electrical harness so as to electrically couple the speed sensor 135 (FIG. 1) residing within the cavity 218 to an aircraft (not shown).

FIG. 4 illustrates a perspective side view of the insert cover portion 200 according to an embodiment of the invention. Particularly, insert cover portion 200 has a generally elongated body portion 400 having a length 406 from first end 402 to a diametrically opposed second end 404. Body portion 400 is generally arcuate having a convex top surface 416 and a convex bottom surface 418. Also, body 400 includes a plurality of portions 408, 410, 412 that are orthogonal to the longitudinal length of body portion 400 and aligned with respective ends 206, 216, and 211. Length 406 of body portion 400 is substantially the length of groove 300 (FIG. 3) and is dimensioned so that portion 408 is aligned with end 206 (FIG. 2), portion 410 is aligned with end 216 (FIG. 2), and portion 412 is aligned with end 211 (FIG. 2) once insert cover portion 200 is coupled to air foil 230 (FIG. 2). Also, portions 408, 410 are dimensioned with a height that causes portion 408, 410 to be substantially flush with the respective ends 206 and 216 (FIG. 2) once insert cover portion 200 is coupled to air foil 230 (FIG. 2). Also, portion 412 is dimensioned so that channel 414 is aligned with groove 221. As such, air foil 230 (FIG. 2) coupled to insert cover portion 200 has a facia that is substantially similar to facia on air foils 220 and 225 (FIG. 2).

The technical effects and benefits of embodiments include a speed sensor module having a selectively removable cover portion for coupling to an air foil in an air cycle machine. The insert cover portion is generally elongated and may be selectively attached over an underlying groove disposes along an axis in the speed sensor module. The underlying groove is configured for receiving a speed sensor cable that traverses a length of the underlying groove.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An insert cover for a speed sensor module, comprising:
   an elongated body having a length aligned along a longitudinal axis, the elongated body including a convex top surface and a uniform width along the length;
   a first portion emanating from the top surface at a first end of the elongated body;
   a second portion emanating from the top surface at a diametrically opposed second end of the elongated body; and
   a third portion emanating from the top surface between the first portion and the second portion;

wherein each of the first, second, and third portions are orthogonal to the longitudinal axis.

2. The insert cover of claim 1, wherein the third portion includes a groove that substantially traverses the width of the elongated body.

3. The insert cover of claim 2, wherein the groove is aligned with a complementary groove on the speed sensor module.

4. The insert cover of claim 1, wherein the first portion includes a first height that is configured to be substantially flush with a complementary end on the speed sensor module.

5. The insert cover of claim 4, wherein the second portion includes a second height that is configured to be substantially flush with a complementary end on the speed sensor module.

6. The insert cover of claim 1, wherein the elongated body is configured to be selectively coupled to at least one air foil disposed in the speed sensor module.

7. A speed sensor module in an environmental control system, comprising:
 an outer portion aligned having a first bore aligned on a shaft axis;
 an intermediate portion having a second bore aligned on the shaft axis;
 an inner portion aligned on the shaft axis, the inner portion including a speed sensor for sensing a rotational speed of a shaft;
 at least one air foil traversing each of the outer, intermediate, and inner portions; and
 an insert cover configured to be selectively coupled to the at least one air foil;
 wherein the outer portion is configured for surrounding each of the intermediate portion and the inner portion within the first bore.

8. The speed sensor module of claim 7, wherein the intermediate portion is configured for surrounding the inner portion within the second bore.

9. The speed sensor module of claim 7, wherein the at least one air foil is orthogonal to a tangent at respective surfaces of each of the outer, intermediate, and inner portions.

10. The speed sensor module of claim 7, wherein the at least one air foil comprises an aperture that is longitudinally coextensive with a body portion of the at least one air foil.

11. The speed sensor module of claim 10, wherein the aperture is configured for receiving an electrical connection for the speed sensor.

12. The speed sensor module of claim 7, wherein the speed sensor module is configured for receiving the speed sensor within an inner cavity disposed in the inner portion.

13. The speed sensor module of claim 7, wherein the insert cover further comprises:
 an elongated body having a length aligned along a longitudinal axis, the elongated body including a convex top surface and a uniform width along the length;
 a first portion emanating from the top surface at a first end of the elongated body;
 a second portion emanating from the top surface at a diametrically opposed second end of the elongated body; and
 a third portion emanating from the top surface between the first portion and the second portion;
 wherein each of the first, second, and third portions are orthogonal to the longitudinal axis.

14. The speed sensor module of claim 13, wherein the third portion includes a groove that substantially traverses the width of the elongated body.

15. The speed sensor module of claim 14, wherein the groove is aligned with a complementary groove disposed in the speed sensor module.

16. The speed sensor module of claim 13, wherein the first portion includes a first height that is configured to be substantially flush with a complementary end disposed in the speed sensor module.

17. The speed sensor module of claim 16, wherein the second portion includes a second height that is configured to be substantially flush with a complementary end disposed in the speed sensor module.

18. The speed sensor module of claim 13, wherein the elongated body is configured to be selectively coupled to the at least one air foil.

* * * * *